US00RE50066E

(19) United States
(12) Reissued Patent
Porat

(10) Patent Number: US RE50,066 E
(45) Date of Reissued Patent: Jul. 30, 2024

(54) CHARGING HANDLE ATTACHMENT FOR FIREARM SLIDE

(71) Applicant: Recover Innovations Ltd., Tel Aviv (IL)

(72) Inventor: Tamir Porat, Tel Aviv (IL)

(73) Assignee: RT Recover Innovations Ltd., Tel Aviv (IL)

(21) Appl. No.: 17/939,084

(22) Filed: Sep. 7, 2022

Related U.S. Patent Documents

Reissue of:
(64) Patent No.: 10,782,081
Issued: Sep. 22, 2020
Appl. No.: 15/861,882
Filed: Jan. 4, 2018

(30) Foreign Application Priority Data

Jan. 10, 2017 (IL) ..... 250048

(51) Int. Cl.
*F41A 3/72* (2006.01)
*F41C 3/00* (2006.01)

(52) U.S. Cl.
CPC ..... *F41A 3/72* (2013.01); *F41C 3/00* (2013.01)

(58) Field of Classification Search
CPC .... F41A 3/72; F41C 3/00; F41C 23/06; F41C 23/10; F41C 27/00
See application file for complete search history.

(56) References Cited

U.S. PATENT DOCUMENTS

| | | | | |
|---|---|---|---|---|
| 9,194,654 | B1 * | 11/2015 | Viani | F41C 27/00 |
| 9,328,991 | B2 * | 5/2016 | Gale | F41G 11/003 |
| D761,374 | S * | 7/2016 | Ellsworth | D22/108 |
| 9,546,843 | B2 * | 1/2017 | Sroufe | F41C 3/00 |
| 9,733,043 | B1 * | 8/2017 | Cohen | F41A 3/72 |
| 10,161,696 | B2 * | 12/2018 | Teitel | F41A 3/72 |
| 10,274,272 | B1 * | 4/2019 | Owensby | F41A 3/72 |
| 2012/0144721 | A1 * | 6/2012 | Glimpse | F41G 1/02 42/132 |
| 2012/0198744 | A1 * | 8/2012 | Meller | F41C 27/00 42/90 |
| 2013/0180152 | A1 * | 7/2013 | Speroni | F41G 1/35 42/99 |
| 2015/0121734 | A1 * | 5/2015 | Kresser | F41A 3/72 42/16 |
| 2015/0354909 | A1 * | 12/2015 | Tarantino | F41A 3/72 89/1.4 |
| 2016/0061562 | A1 * | 3/2016 | Braun | F42C 3/00 42/111 |
| 2016/0102938 | A1 * | 4/2016 | Sroufe | F41A 3/72 42/16 |
| 2018/0112945 | A1 * | 4/2018 | Sroufe | F41A 19/30 |

* cited by examiner

*Primary Examiner* — Jeffrey R Jastrzab
(74) *Attorney, Agent, or Firm* — Dekel Patent Ltd.; David Klein

(57) ABSTRACT

A firearm slide accessory includes a charging handle member including an upper member and a lower member. Both the upper and lower members are formed with internal serrations that mate with external serrations of a slide. One or more fasteners secure the upper and lower members together.

7 Claims, 3 Drawing Sheets

CHARGING HANDLE ATTACHMENT FOR FIREARM SLIDE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates generally to weapons and weapon accessories, and particularly to a charging handle attachment that can be used to better grip and pull the slide of a firearm to charge the firearm.

BACKGROUND OF THE INVENTION

Conventional semi-automatic handguns generally make use of a slide assembly to load, cycle and fire individual rounds. When loading an initial round into a chamber, a user must generally pull or "slide" the slide assembly to a rearward position, whereby a topmost round is stripped from a magazine and fed into the chamber. The force required to direct the slide assembly to the rearward position can be more than a user expects and in some cases, create difficulty for smaller or older individuals to operate. Manufacturers have addressed this by creating ribs, channels and/or similar features on the sides of the slide assembly to provide a gripping area by which the user can more easily retain and apply force to the slide assembly. However, these gripping areas are often times insufficient for certain users.

There is a need for a user-friendly accessory to assist in cycling the slide assembly.

SUMMARY OF THE INVENTION

The present invention seeks to provide a charging handle attachment that can be used to better grip and pull the slide of a firearm to charge the firearm, as is described more in detail hereinbelow. The terms firearm and weapon and used interchangeably throughout.

There is provided in accordance with an embodiment of the invention a firearm slide accessory including a charging handle member including an upper member and a lower member, wherein both the upper and lower members are formed with internal serrations that mate with external serrations of a slide, and one or more fasteners that secure the upper and lower members together.

In accordance with an embodiment of the invention the upper and lower members are formed with external serrations that match external serrations of the slide.

In accordance with an embodiment of the invention one of the upper and lower members is formed with one or more tapped holes to accept the one or more fasteners.

In accordance with an embodiment of the invention the upper member does not block a rear sight of the slide.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
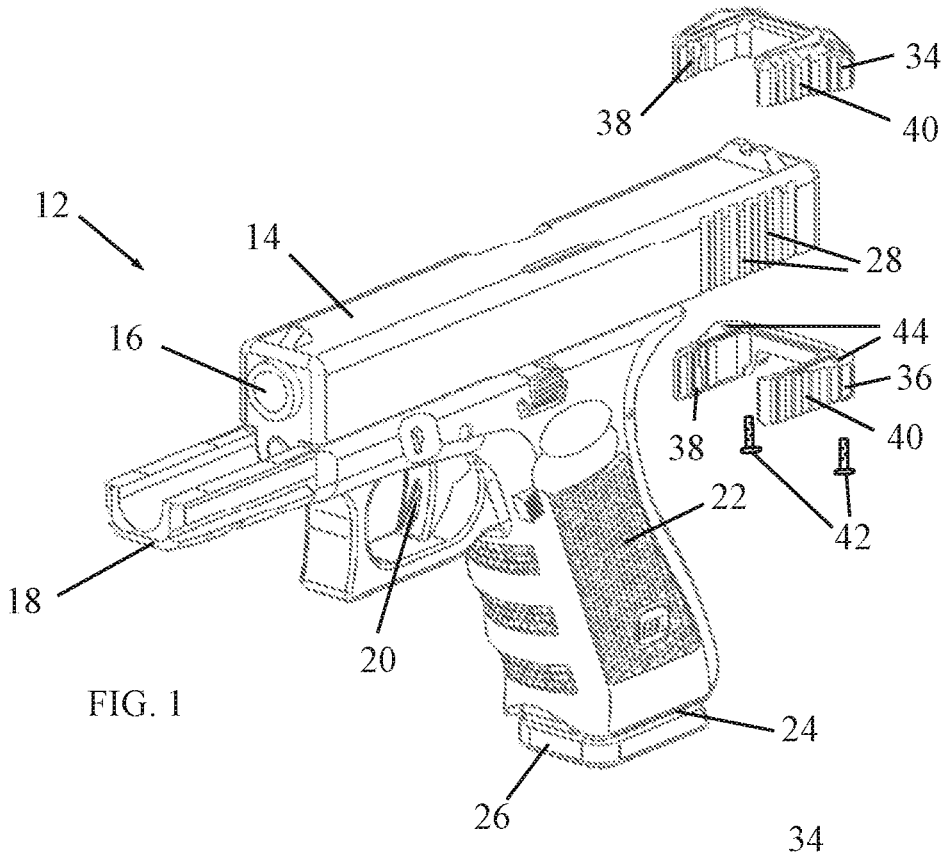
FIGS. 1 and 2 are simplified exploded and pictorial illustrations, respectively, of a weapon before and after attachment of a charging handle member to a slide of the weapon, in accordance with a non-limiting embodiment of the present invention.
Figure 2:
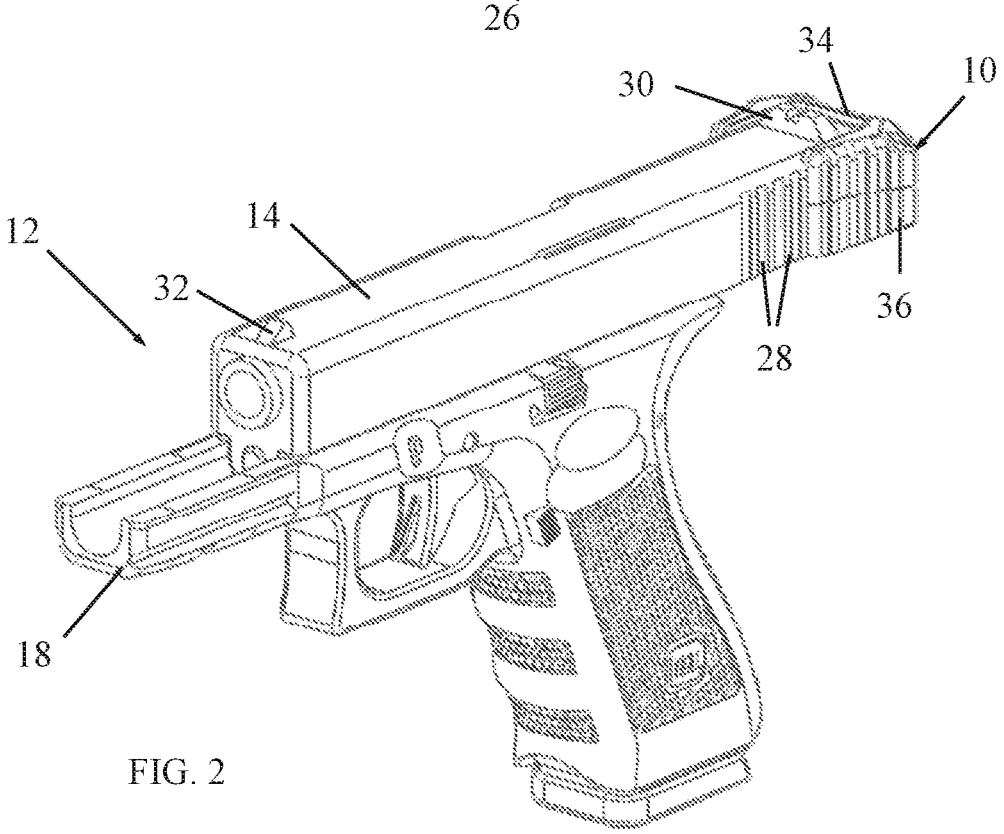

Reference is now made to FIGS. 1 and 2, which illustrate a charging handle member 10 for use with a firearm 12, constructed and operative in accordance with a non-limiting embodiment of the present invention.

The firearm 12 is illustrated as one of the GLOCK handguns. The firearm 12 has a slide 14, barrel 16, frame 18, trigger 20, handle 22, and a magazine well 24 for inserting therein a magazine 26. Slide 14 must be pulled back for initially charging the firearm. A rear portion of slide 14 is manufactured with external serrations 28. Slide 14 has rear and forward sights 30 and 32.

The charging handle member 10 includes an upper member 34 and a lower member 36. Both the upper and lower members 34 and 36 are formed with internal serrations 38 that mate with the external serrations 28 of the slide 14. In this manner, both the upper and lower members 34 and 36 are positively secured to slide 14. Both the upper and lower members 34 and 36 may also be formed with external serrations 40 that match the external serrations 28 of the slide 14 so as to give an aesthetically pleasing texture to the charging handle member 10 that blends with the original serrations of the slide.

The upper and lower members 34 and 36 are secured together with one or more fasteners 42, such as screws. For example, the upper and lower members 34 and 36 may be formed with one or more mounting holes 44 to accept the fastener or fasteners 42 (one set of the holes may be tapped to accept the fasteners so that no nuts are needed; other fasteners may be used, such as but not limited to, screws with nuts, pins or rivets and others). The fasteners 42 are important so that the charging handle member 10 is properly secured to slide 14 and will not budge during years of use.

The upper and lower members 34 and 36 may be made of any suitable material, such as but not limited to, polymer, aluminum alloy, steel alloy, elastomer and the like. The upper and lower members 34 and 36 may have the same color as slide 14 or may be made of different colors.

Figure 4:
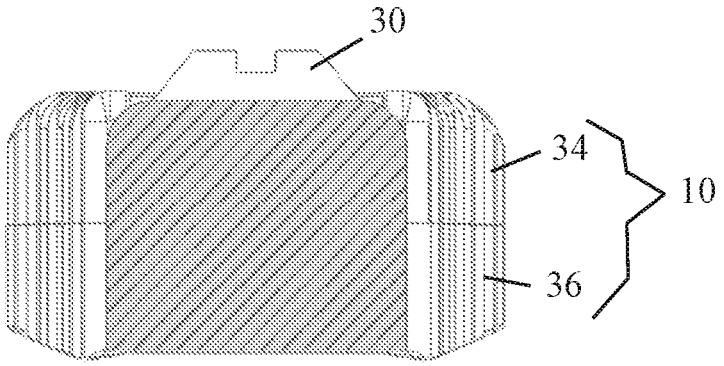

As seen especially in FIG. 4, the upper member 34 does not block the rear sight 30 of slide 14.

Figure 5A:
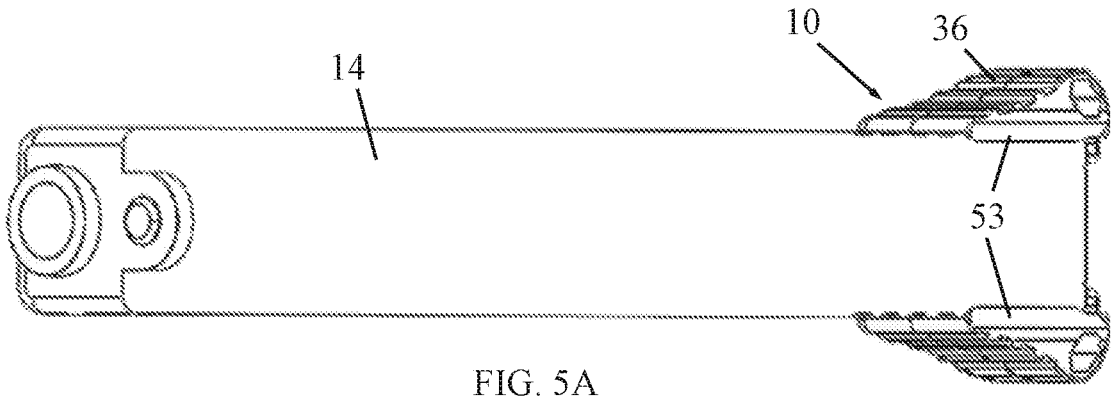
FIGS. 5A and 5B are pictorial and enlarged illustrations, respectively, of the charging handle member attached to the slide, as seen from the underside of the slide
Figure 5B:
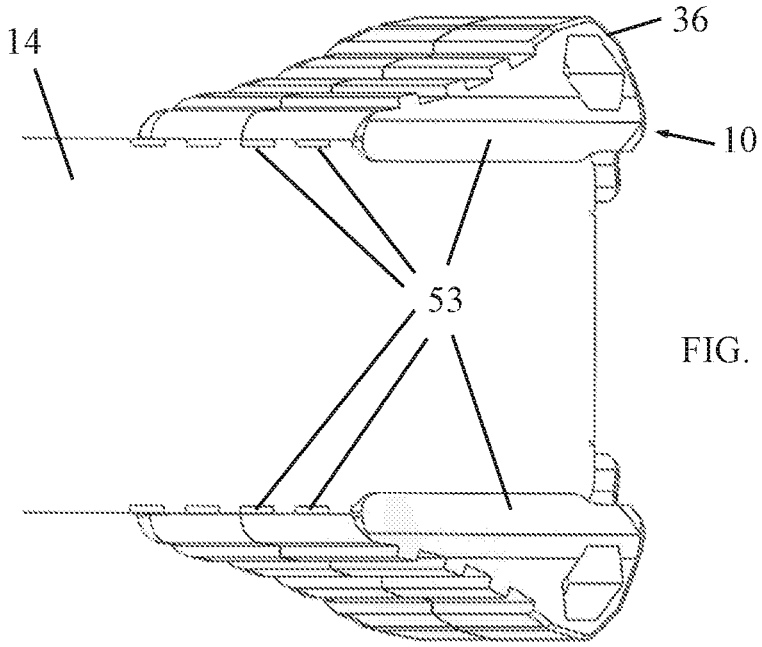

As seen in FIGS. 5A and 5B, the lower member 36 may be formed with ridges 53 that overlie the bottom surface of the slide 14. These ridges 53 help secure the charging handle member 10 to the slide 14 so that it does not fall off the slide 14.

Figure 3:
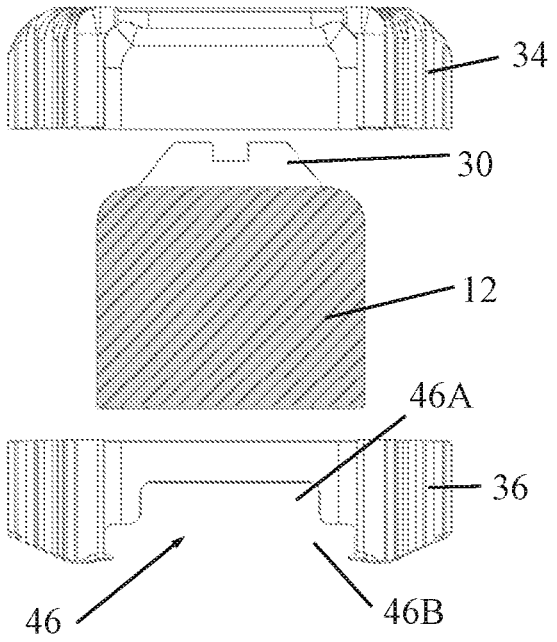
FIGS. 3 and 4 are simplified end-view illustrations, respectively, before and after attachment of the charging handle member to the slide of the weapon.

As seen in FIGS. 1 and 3, a rear face of lower member 36 may be formed with a lower cutout 46 having an upper narrower portion 46A and a lower wider portion 46B. The cutout 46 accommodates the back plate of the slide (not shown) which is found in GLOCK models.

What is claimed is:

1. A firearm comprising:

a slide, a barrel with an opening from which a projectile can be expelled, a frame, a trigger, a handle, and a magazine well for inserting therein a magazine, [a rear portion of said slide being formed with external serrations and] said slide comprising a rear surface that faces in a direction opposite to said opening of said barrel;

a charging handle member comprising a first member and a second member[, wherein both said first and second members are formed with internal serrations that mate with said external serrations of said slide]; and wherein said first and second members are fastened together by one or more fasteners that are directed and tightened in a direction perpendicular to a longitudinal axis of said slide*, and wherein said second member is formed with a first ridge and a plurality of discrete second ridges, all of said ridges overlying a surface of said slide that is perpendicular to said rear surface, said first ridge being longer and more rearward than said second ridges*.

[2. The firearm according to claim 1, wherein said second member is formed with a first ridge and a plurality of discrete second ridges, all of said ridges overlying a surface of said slide that is perpendicular to said rear surface, said first ridge being longer and more rearward than said second ridges.]

3. The firearm according to claim 1, wherein a rear face of said second member is formed with first and second cutouts that extend into each other, said first cutout being wider than said second cutout.

4. The firearm according to claim 1, wherein said first and second members are formed with external serrations that match external serrations of the slide.

5. The firearm according to claim 1, wherein one of said first and second members is formed with one or more tapped holes to accept said one or more fasteners.

6. A method comprising mounting said charging handle member of claim 1 on said firearm of claim 1 with said one or more fasteners of claim 1, without doing any rework to said slide of claim 1.

*7. A firearm accessory comprising:*

*a charging handle member comprising a first member and a second member, a longitudinal axis being defined along a length said charging handle member, wherein when said charging handle member is affixed to a slide of a firearm, said length extends forwards from a rear portion of said slide towards an opening from which a projectile can be expelled; and*

*one or more fasteners, wherein said first and second members are fastened together by said one or more fasteners that are directed and tightened in a direction perpendicular to said longitudinal axis, and wherein said second member is formed with a first ridge and a plurality of discrete second ridges, all of said ridges overlying a surface of said slide that is perpendicular to said rear surface, said first ridge being longer and more rearward than said second ridges.*

*8. A firearm accessory comprising:*

*a charging handle member comprising a first member and a second member, a longitudinal axis being defined along a length said charging handle member, wherein when said charging handle member is affixed to a slide of a firearm, said length extends forwards from a rear portion of said slide towards an opening from which a projectile can be expelled; and*

*one or more fasteners, wherein said first and second members are fastened together by said one or more fasteners that are directed and tightened in a direction perpendicular to said longitudinal axis, wherein a rear face of said second member is formed with first and second cutouts that extend into each other, said first cutout being wider than said second cutout.*

* * * * *